United States Patent
Bertrand

[15] 3,656,348
[45] Apr. 18, 1972

[54] PRESSURE MEASURING DEVICES OF THE ELECTRICAL COUNTERBALANCING FORCE BALANCE TYPE

[72] Inventor: Pierre Claude Bertrand, Pau-Billere, France

[73] Assignee: Compagnie des Compteurs, Paris, France

[22] Filed: July 28, 1970

[21] Appl. No.: 58,802

[30] Foreign Application Priority Data

Aug. 11, 1969 France..................................6927550

[52] U.S. Cl. ............................................73/398 R, 73/407
[51] Int. Cl. ..........................................................G01l 9/10

[58] Field of Search..........................................73/407, 398 R

[56] References Cited

UNITED STATES PATENTS

3,342,072  9/1967  Trekell..............................73/407 X

Primary Examiner—Donald O. Woodiel
Attorney—Pierce, Scheffler and Parker

[57] ABSTRACT

The improvements brought to force balance pressure measuring devices include a measurement unit, a measurement bellows, two flexible diaphragms, a liquid filling the interval between the diaphragms and an electrical force balance set into a proof chamber.

7 Claims, 5 Drawing Figures

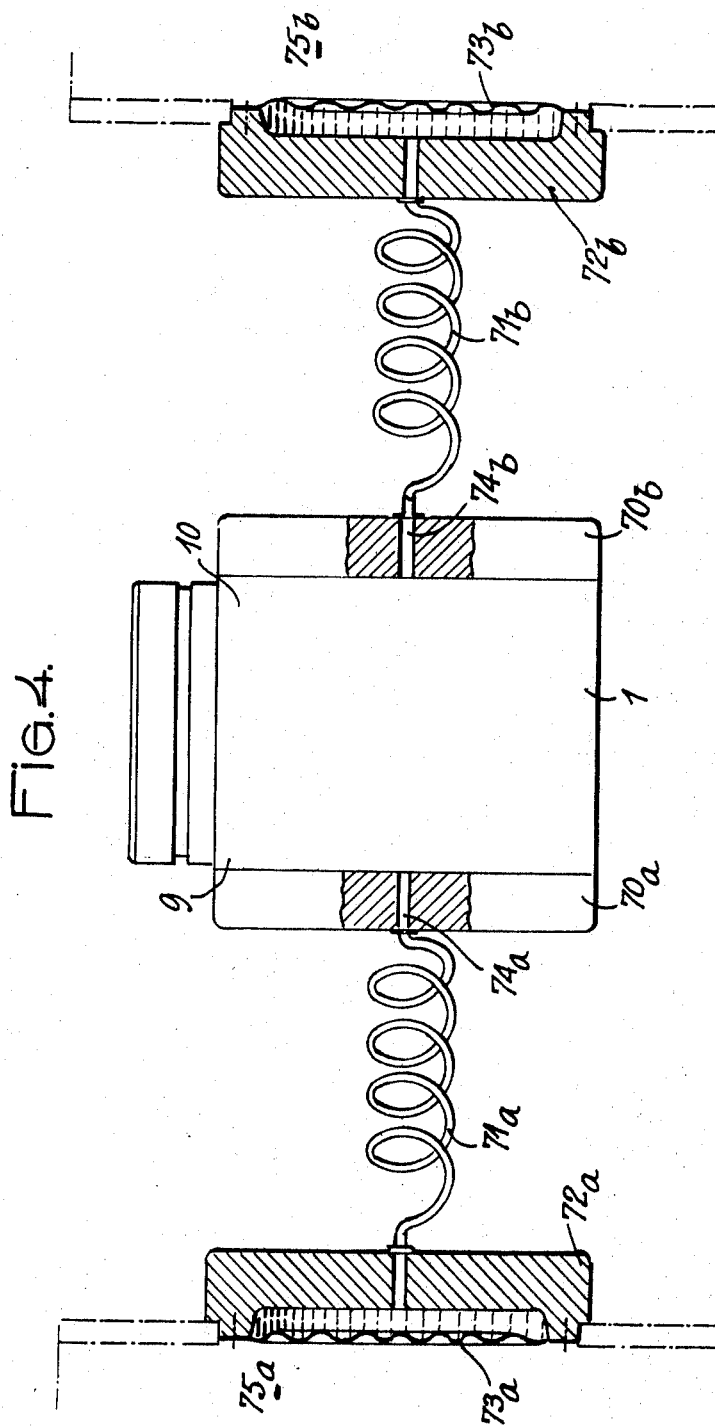

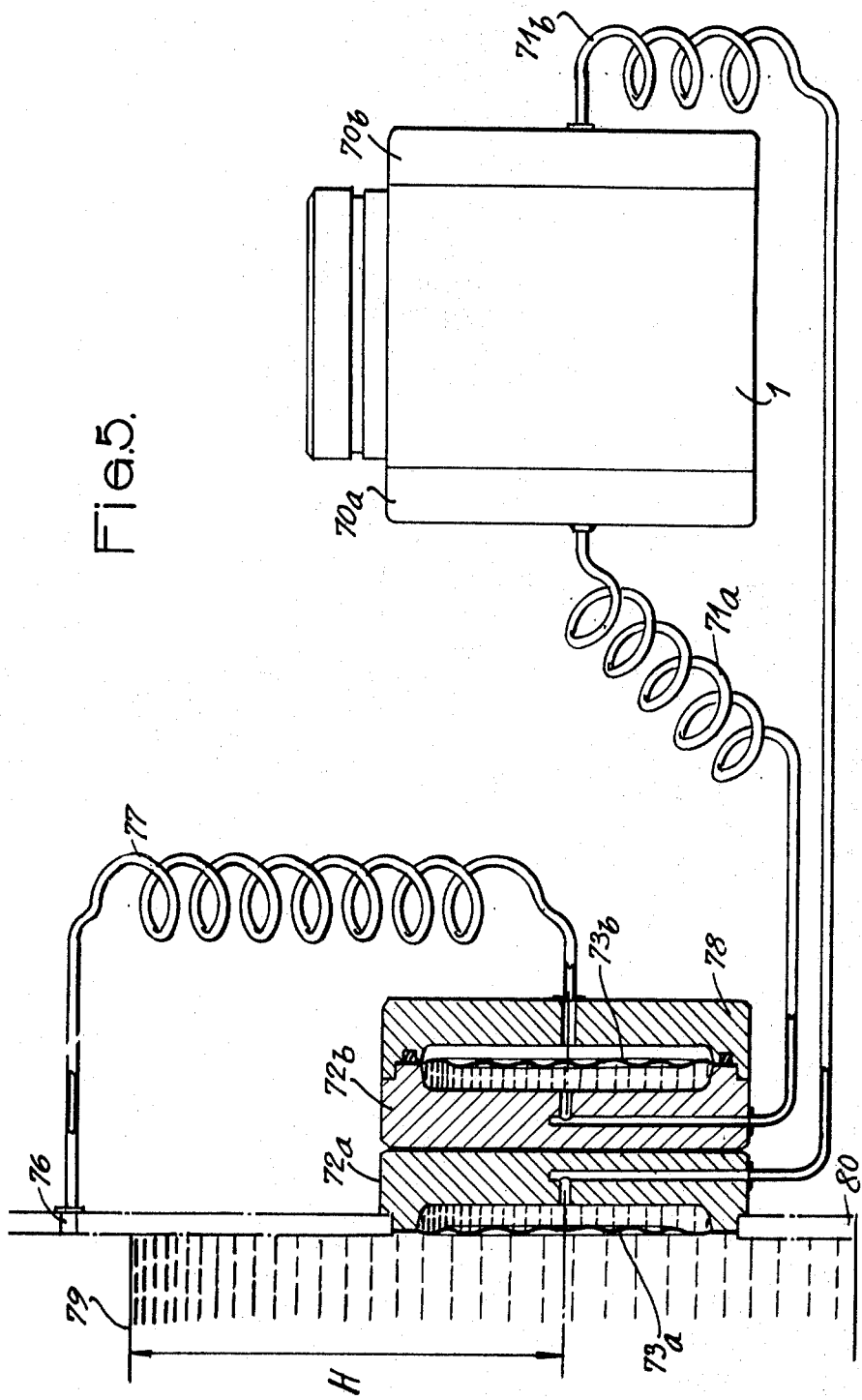

PRESSURE MEASURING DEVICES OF THE ELECTRICAL COUNTERBALANCING FORCE BALANCE TYPE

This invention relates to various improvements brought to pressure measuring devices of the electrical counterbalancing force balance type.

Said devices are used in all technical branches wherein is required the measurement of a differential pressure, actual or absolute and, in case of need, of any other size (output or level, for instance) the measurement thereof may be reckoned by comparison with a pressure.

A number of devices of this type, particularly for the measurement of differential pressures, are already in common use. Said devices generally include a measurement diaphragm or bellows subjected to the pressures to be compared and the deformations thereof are measured by means of an electrical counterbalancing force balance on the beam of which the measurement unit exerts a force. The intensity of the current required for the counterbalancing of the balance provides an indication of the pressure difference. In some cases, the two pressures to be compared are conveyed to the measurement unit through an incompressible fluid and two highly flexible diaphgrams. In some instances, the force balance is sunk into the fluid filling one of the two chambers set between the measurement unit and one of the two above mentioned diaphragms. A device of said type is described in French patent application No. 6920508 filed on June 19, 1969 by the applicant.

The devices of this type in use heretofore present a number of inconveniences. Owing to the important number of parts required for the construction thereof, they are fragile, intricate and expensive. The latter inconvenience is increased by the necessity to dispose of as many constituent parts as device calibers which means pressure ranges wherein a given device can work.

The main object of this invention is to overcome the above inconveniences. Its aim is basically to provide a simple, sturdy and unexpensive device capable of being adapted to various utilization cases, merely by minor changes. It becomes thus possible to make devices having different calibers by using a small number of parts, the basic parts being common to an entire range of devices. The aim of the invention is to derive advantage from embodiment simplicity in order to improve certain performances of these devices, particularly the firmness thereof at high pressures and at wide temperature variations.

The object of the invention is an electrical counterbalancing device for pressure measurements which includes a measurement unit, a measurement bellows, two flexible diaphragms conveying the pressures to be compared to said measurement unit, a liquid filling the gap existing between said diaphragms and through which pressures are conveyed, a proof chamber filled up with liquid, delimited by the bellows and one of the two diaphragms and electrical force balance set into said proof chamber, wherein said unit is formed of a magnetic piece of material punched with cylindrical holes in which are housed the various constituent parts, particularly a hole running through the unit, between the two diaphragms, in which is tightly secured the foot part of the measurement bellows the other closed tip thereof is connected to the balance lever, on one side of said bellows, a flat bottom blind hole in which is stuck the permanent magnet of the magnetic circuit of the balance counterbalancing motor, on the other side of the bellows, another blind hole in which is set, by means of a magnetic rest, a variation detector for said balance, and, set on either sides of the plane defined by the axis of the above holes, two additional blind holes wherein are respectively secured rests of a double part cross-tape joint, all the aforesaid holes being worked out on the same side of the unit and facing one of the two diaphragms, and finally a blind hole the axis thereof is at right angle with the axis of the other holes, inside of which is placed an helical spring for zero setting, one tip thereof being secured to the lever and the other tip secured to a nut allowed to be driven along a translation motion from outside, by means of a screw running tightly through the unit.

Various other features of the invention appear from the following description made in connection with the accompanying drawings, and relating to various embodiments of the invention which are indicated as non-restrictive examples.

FIG. 4 is a diagrammatic view of a different embodiment.

FIG. 5 is a diagrammatic view, showing a specific application of the measurement device according to the invention.

Figure 1:
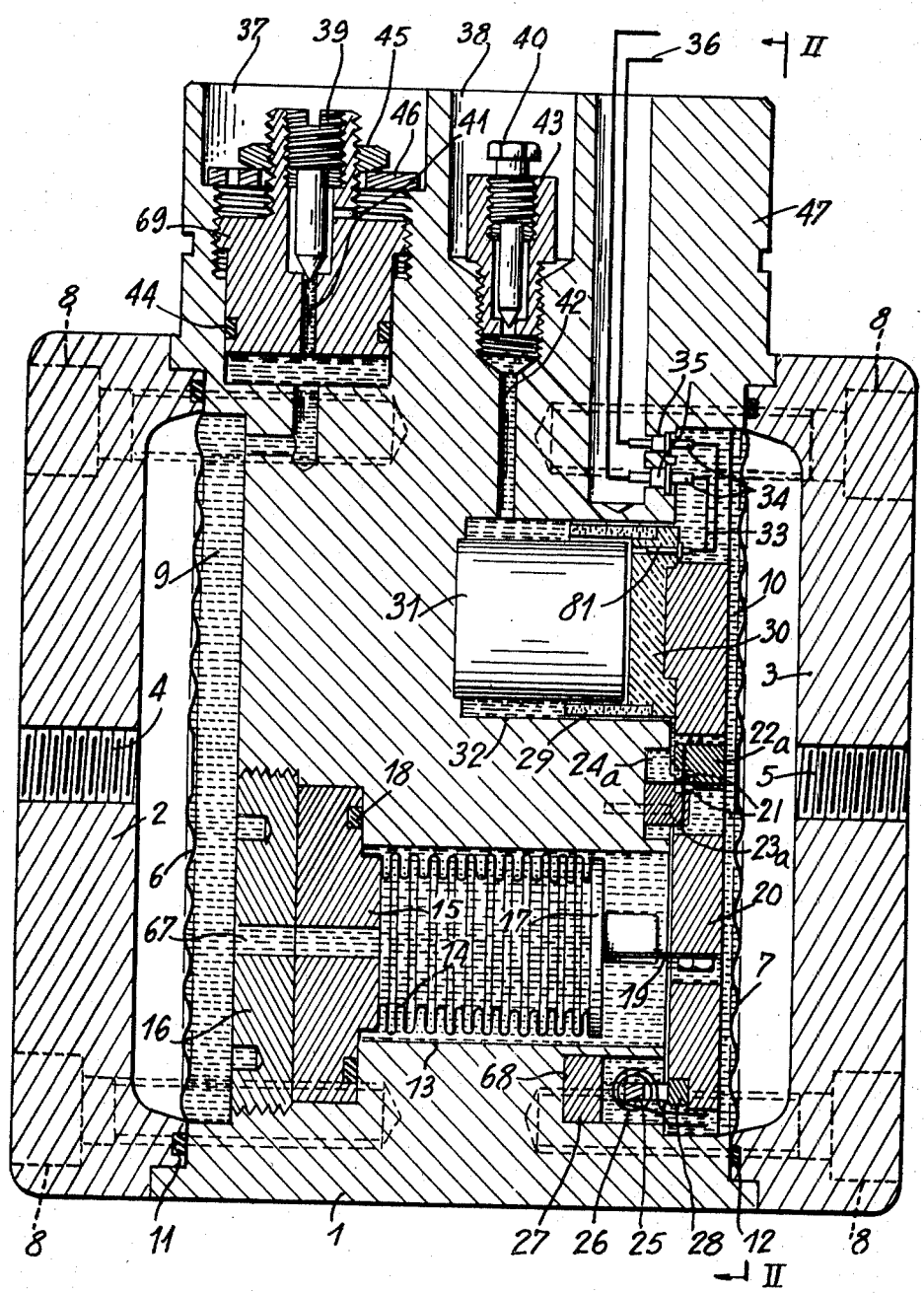
FIG. 1 is a sectional elevational view of the differential pressure measurement device, according to the invention.

On FIG. 1 is shown the measurement unit 1 of the device. Said measurement unit 1 is made of a magnetic material and is punched with a number of cylindrical holes described in sundry details hereinafter. Flanges 2 and 3 are secured to said unit by means of highly resistant screws 8. The fluids the pressure variation of which is intended to be measured are poured in through port holes 4 and 5 respectively worked out through flanges 2 and 3. Every pressure to be measured is exerted on a highly flexible diaphragm, respectively 6 and 7, made of a non-corrodible material, for instance, and which thereby conveys the pressure to a lump of oil contained in chambers 9 and 10 delimited by the measurement unit and diaphragms 6 and 7.

Diaphragms 6 and 7 are tightened between flanges 2 and 3 and unit 1, while tightness is ensured by gaskets 11 and 12; said diaphragms may also be stuck on unit 1.

Said unit is run through by a first cylindrical staged hole 13 wherein is set a metallic measurement bellows 14 which shuts off chambers 9 and 10. Bellows 14 is welded on a punched plug 15, secured by a screw 16 which is also punched. At the other tip of bellows 14 is welded a plate 17.

Tightness between chambers 9 and 10 is ensured by welding of bellows 14 on plug 15 and by a gasket 18 the plug 15 is fitted with. The inner part of bellows 14 is connected with chamber 9 through duct 67 punched through plug 15 and screw 16, said duct 67 thereby providing connection between the inner part of the bellows and chamber 9.

Bellows 14 is linked through flexible blade 19 to lever 20 made of a non-magnetic material. Lever 20, which forms the force balance beam, is jointed by means of four crossed tapes 21. Two of said tapes 21 are secured on the one hand to a portion 22a of lever 20 and, on the other hand, to a fixed rest 23a screwed into a blind cylindrical hole 24a of unit 1. The two other tapes are secured, on the one hand, to a portion 22b screwed into a blind cylindrical hole 24b of unit 1, as shown on FIG. 2.

The variation detector of the force balance, which is set on the same side as bellows 14, is made of a "U" shaped ferrite part, forming a core around which is winded up a coil 26. Part 25 is stuck on a non-magnetic rest 27 which is adjusted and stuck or screwed into a blind cylindrical hole 68 of body 17 (FIG. 1). Part 25 cooperates, according to a standard way, with a ferrite blade 28 stuck onto lever 20 in order to form said variation detector.

The counterbalancing motor, set at the opposite side of bellows 14, is formed of a wire-wound coil 29 secured to lever 20 through insulating part 30. Coil 29 is set into the air gap of a magnetic circuit made of a permanent magnet 31 stuck onto the flat bottom of a cylindrical blind hole 32 of unit 1. Wires of coil 29 are welded on prongs 81 made of a conducting material connected by flexible wires 33 to insulating terminals 34 tightly fitted in a supporting wall of unit 1. Terminals 34 are stuck or welded to unit 1 into small cylindrical holes 35 thereof. Flexible wires 36 connect terminals 34 to a servo electronic circuit set into casing 49 (FIG. 2).

Staged cylindrical holes 37 and 38, worked into unit 1, allow the oil filling-in and regulation of the oil volume poured in. The filling-in is carried out by unscrewing cone-point screws 39 and pouring in oil under vacuum through ducts 41 and 42. Duct 42 is drilled into plug 43 tightly screwed in the bottom part of hole 38. Duct 41 is drilled into plug 69 screwed in the bottom part of hole 37 and made tight by means of gasket 44. Cone-point screws 39 and 40 are screwed up after the filling operation. The oil volume regulation is obtained by unscrewing cone-point screw 39 and by screwing or unscrewing plug 69 which causes the flowing or the flowing back of a certain quantity of oil into chamber 9 through duct 41. Plug 69 is then tightened in adequate position by screw 45 which rests upon washer 46, and cone-point screw 39 is thereafter screwed up again.

Figure 2:
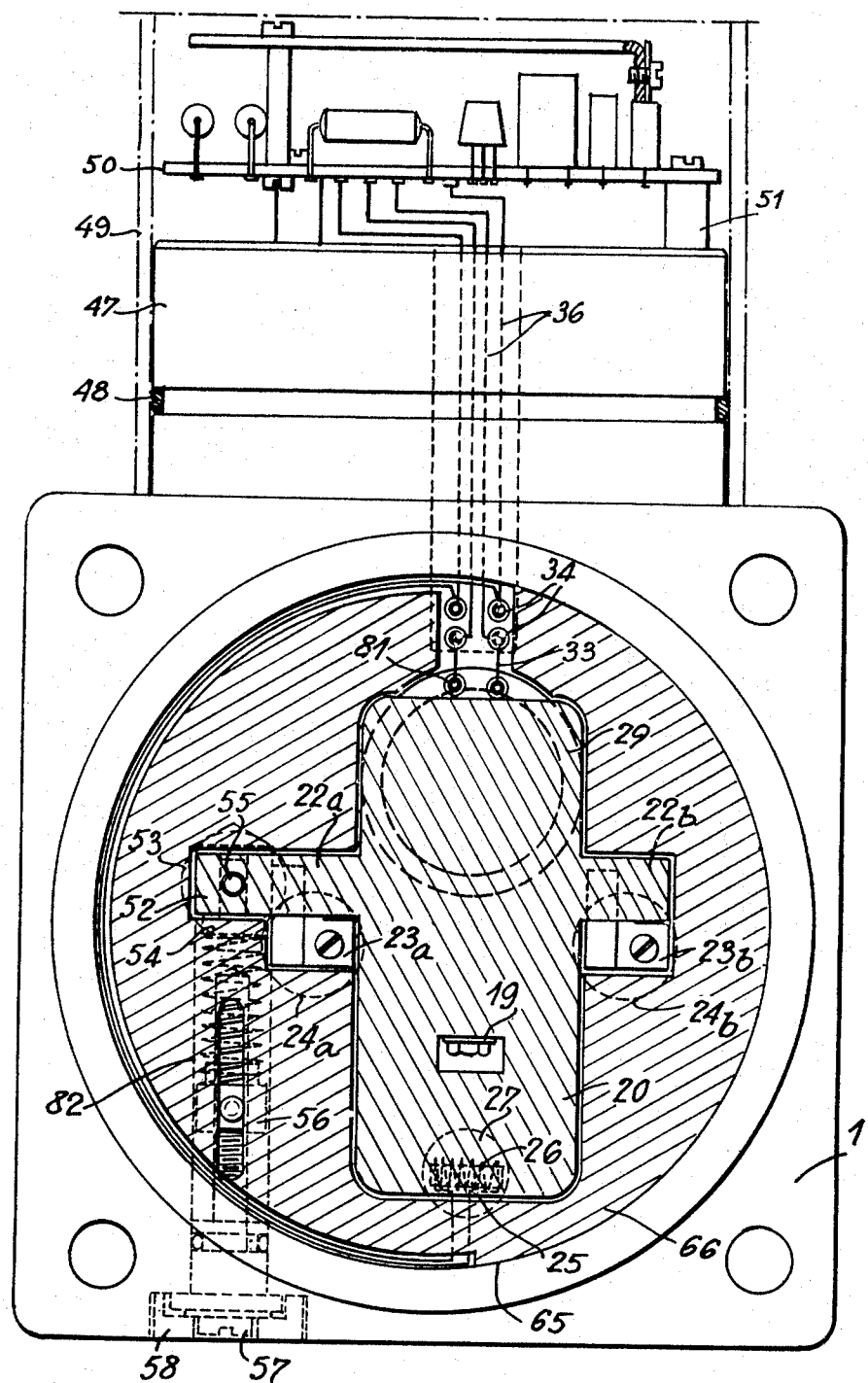
FIG. 2 is a sectional view of the device along line II—II of FIG. 1.

As shown on FIG. 2, is a boss 47, set on the upper portion of unit 1, whereon is fitted an electronic servo control box 49. Gasket 48, housed into a groove of boss 47, ensures tightness of box 49. A printed electronic circuit stand 50 is fitted on boss 47 through struts 51. On FIG. 2 is also seen lever 20 which includes two arms 22a and 22b whereon are fastened the tapes of the crossed tape joint 21 which is made of two parts. Stands 23a and 23b are secured by screwing, respectively into blind holes 24a and 24b of unit 1. Said holes 24a, 24b are worked out in either sides of the plane defined by holes 32 and 68 axis and on the same side of unit 1, opposite diaphragm 7. Arm 22a of lever 20 bears a portion 52 which penetrates into cylindrical hole 53 of unit 1, the axis of said hole being parallel to the axis of the above mentioned holes. One of the tips of an helical spring 54 is fastened thereon by means of a screw 55; the other tip of said spring, which is used for zero setting, is secured to a nut 56 which a tight screw 57, held in position by a plug 58, allows to move axially. By turning screw 57 in a way or in another, a positive or negative zero displacement torque may be created manually. Spring 54 is housed into a blind hole 82 the axis thereof is at right angle with the axis of the above mentioned holes. Lever 20 will advantageously be made of a non-magnetic material. The gap between lever 20 and bore 65 of unit 1 wherein it is housed is filled up by a metallic part 66, also obtained by molding. FIG. 2 also shows the connection between winding 26 and electronic circuit 50 through wires 36 and crossings 34.

In the case of differential pressure measurement devices intended to be subjected to important unilateral over-pressures, bellows 14 must be protected by means of a double hydraulic valve, or protecting valve, resting plug 25 and screw 16. Said double valve may advantageously be combined with a releasing system set between blade 19 and lever 20. On account of their standard type, said systems are not shown on the drawing.

In the case of absolute pressure conveyors, i.e. with respect to vacuum, gaskets 11 and 12 must be of a special type especially designed for vacuum use and one of the mouth-pieces 4 or 5 of flange 2 or 3 wherein the reference vacuum is made, once for ever, must thereafter be tightly sealed, by means of welding for instance.

Figure 3:
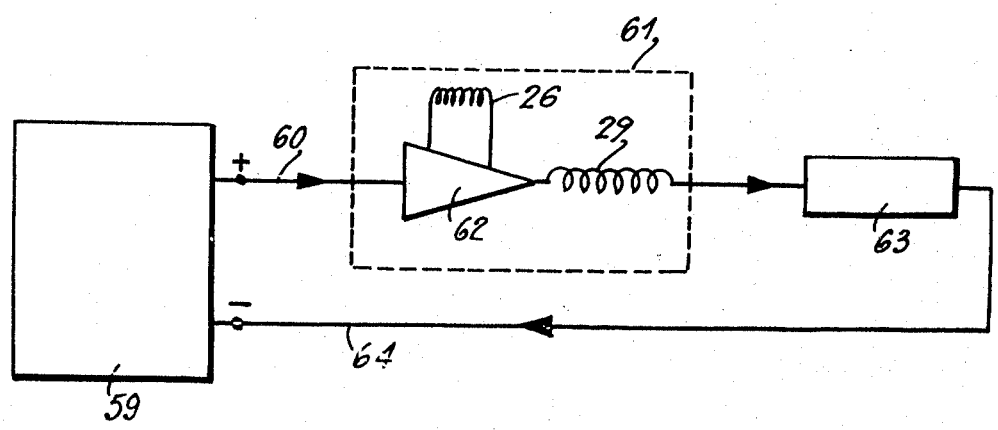
FIG. 3 is a diagrammatic view of the electrical circuit of the device.

On FIG. 3 is shown a D.C. power supply 59 connected by a wire 60 to a measurement apparatus 61, which includes an amplifier 62 monitored by detector winding 26, said winding 26 being connected in series with counterbalancing motor coil 29. A load 63, which may be an indicator or a recording device, or also a regulator, is connected in series and a wire 64 connects said load to the second power supply terminal 59. The electric circuit serving for the setting of the measurement span of the transmitter is of a standard type and therefore not shown on the drawing. Such a circuit may be, for instance, of the type described in the above mentioned patent application 6920508.

On FIG. 4 is shown a different embodiment according to which flexible diaphragms are set at a certain distance from unit 1. In this case, flanges 70a and 70b are fitted which are in direct contact with filling oil of chambers, respectively 9 and 10. Said chambers are connected, through port holes 74a and 74b, respectively with diaphragms 73a and 73b by means of flexible metallic pipes 71a and 71b, tightly welded, on the one hand, onto flanges 70a and 70b, on the other hand, onto diaphragms rests 72a and 72b. Diaphragms 73a and 73b are tightly secured onto their respective rests 72a and 72b. The pressures prevailing in enclosures 75a and 75b are thereby fully conveyed to unit 1 through flexible diaphragms 73a and 73b and through the filling liquid.

On FIG. 5, the level of a liquid contained in a tank 80 is marked 79. Diaphragm rests 72a and 72b are in this instance arranged one against the other, a flange 78 being fitted on rest 72b. Diaphragm 73a is directly subjected to the pressure of the liquid. Diaphragm 73b is subjected to the atmosphere pressure prevailing in tank 80 above level 79, owing to a pressure intake 76 connected by means of a tight flexible pipe at the inner part of flange 78. The pressure variations conveyed by diaphragms 73a and 73b and also by the filling liquid to unit 1 is thus equal to $\omega H$, $\omega$ representing the volumetric weight of the filling liquid and H the liquid height above the axis of said diaphragms.

It is obvious that, merely with a central measurement unit 1 and a small number of interchangeable parts, the invention makes it possible to build, either a measuring device for actual, differential or absolute pressures, diaphragms 6 and 7 being directly set on unit 1 or at a certain distance thereof, or a device for the measuring of liquid levels. The arrangements hereinabove described also allow, by using the same basic parts and a small number of interchangeable parts, to work out a range of different devices of the same type. As a matter of fact, unit 1, diaphragms 6 and 7, flanges 2 and 3, zero setting spring 54, variation detector 25, counterbalancing motor 29 and electronic circuit 50 are common to all devices of a same range.

Changing from a calibre to another can be merely done by replacing the sub-assembly formed by bellows 14 and foot-parts 15 and 17 by another sub-assembly the bellows thereof has a different actual surface and by changing lever 20 and also filling part 66, so as to displace the joint axis of cross-tapes 21, thereby allowing the modifying of the ratio of the force balance lever arms. It is then desirable that holes 24a and 24b, cylindrically shaped on FIG. 2, have an oblong section (button hole shape, for instance), so as to allow several different fastening positions of rests 23a and 23b.

It will be noted that such an arrangement is feasible only if cross-tape joint 21 is made of two parts, which allows the setting of said two parts between bellows 14 and counterbalancing motor 29 as well as on either sides of said bellows and said motor. The ratio of the lever arms of the force balance between bellows 14 and motor 29 may thereby be modified according to ratios which can be made as important as possible.

The advantages of the above described embodiment are obvious.

As a matter of fact, the invention makes it possible to manufacture, according to a simple process, devices of different types and, for a given type, different calibres, thereby allowing economical the manufacturing of said devices. The cost price thereof is all the more low as measurement unit 1, which forms the basic part, is made of a compact block wherein are worked out a number of cylindrical holes the tooling thereof is extremely simple.

The making of unit 1 according to the above described method ensures, besides, great sturdiness. Devices so constructed are capable of resisting to higher pressures than those wherein force balance rest is made of several parts.

Moreover, the influence of temperature variations to which a device is subjected is lessen on account of the reasons indicated hereunder. On the one hand, the strain of a solid body, resulting from an important temperature variation, is lower and more reproductible than that of a body formed of an assembly of several separate parts. On the other hand, the oil volume required is limited at a minimum, thereby the influence of the expansion of this filling liquid is in so far reduced. Said influence is furthermore attenuated by volume adjustment plug 69 which allows the setting, after a test at the required temperature, of chamber 9 volume at such value that respective increases of the pressure of the liquid contained in chambers 9 and 10, as a result of a temperature rise, are equal and that the effect thereof on bellows 14 will become practically null. Said pressure increases result from the combined effect of the expansion of chambers 9 and 10 liquid and of the tautness of diaphragms 6 and 7. In the case said diaphragms are absolutely the very same, the volume setting will merely serve for adjusting the volume of chamber 9 in order to make it equal to that of chamber 10.

It should be remarked that during the volume adjustment work, as described above, diaphragms 6 and 7 remain strictly in the same position which constitutes an additional advantage compared with other adjustment systems already known wherein any change in the diaphragm position entails an alteration of the characteristics thereof.

Devices built according to the invention meet practical requirements better than those in common use heretofore. Said devices are particularly efficient and adaptable for the equipment of industrial installations such as checking and regulating installations.

Although a specific embodiment only of the invention has been described and illustrated, it is obvious that various changes and modifications may be made without departing from the spirit of the invention and all of such changes are contemplated as may come within the scope of the claims. As mentioned already above, a protecting valve and an unclutching system of the force balance may be fitted on the device. Besides, any part may be replaced by another part which is equivalent from the technical standpoint, the measurement bellows may thus be replaced by a diaphragm. Generally speaking, all possible modifications, in addition to the above described example, come within the scope of the invention.

We claim:

1. A pressure measurement device comprising a measurement unit, a measurement bellows, two flexible diaphragms conveying the pressures to be compared to said measurement unit, a liquid filling the gap existing between said diaphragms and through which pressures are conveyed, a proof chamber filled up with liquid, delimited by the bellows and one of the two diaphragms, and electrical force balance set into said proof chamber, wherein said unit is formed of a magnetic piece of material punched with cylindrical holes in which are housed the various constituent parts, particularly a hole running through the unit, between the two diaphragms, in which is tightly secured a foot part of the measurement bellows the other closed tip thereof is connected to a balance lever, on one side of said bellows, a flat bottom blind hole in which is stuck the permanent magnet of the magnetic circuit of the balance counterbalancing motor, on the other side of the bellows, another blind hole in which is set, by means of a magnetic rest, a variation detector for said balance, and, set on either sides of the plane defined by the axis of the above holes, two additional blind holes wherein are respectively secured rests of a double part cross-tape joint, all the aforesaid holes being worked out on the same side of the unit and facing one of the two diaphragms, and finally a blind hole the axis thereof is at right angle with the axis of the other holes, inside of which is placed an helical spring for zero setting, one tip thereof being secured to the lever and the other tip secured to a nut allowed to be driven along a translation motion from outside, by means of a screw running tightly through the unit.

2. A pressure measurement device according to claim 1, wherein the measurement unit also bears a bore wherein is set the force balance lever made of a non-magnetic alloy, the gap between said lever and said bore being filled by a molded part, also made of a non-magnetic alloy, fastened on said unit with a practically equal play around said lever.

3. A pressure measurement device, according to claim 1, wherein the measurement unit is further provided with tight insulated crossings fastened into holes wherein they fit, said crossings connecting outwardly the wires of the counterbalancing motor and of the variation detector.

4. A pressure measurement device, according to claim 1, wherein the measurement unit includes two separate chambers, filled up with a liquid, one of said chambers being delimited by the measurement bellows and one of the diaphragms and being connected with a filling cone-point tap, the other chamber being delimited by the measurement bellows and the other diaphragm and being connected with another filling cone-point tap borne by an adjustable tight plug.

5. A pressure measurement device, according to claim 1, wherein the measurement unit is set apart from flexible diaphragms set at a certain distance thereof onto two tight rests the inner volumes thereof are connected with the measurement unit through flexible metallic pipes tightly welded at one of the tips thereof on each diaphragm rest, and at the other tip thereof on flanges fastened by means of screws on either sides of the unit, both volumes delimited by the measurement bellows and each of the two diaphragms being filled up with a liquid.

6. A pressure measurement device, according to claim 5, wherein the two diaphragm rests are fastened back to back, so both diaphragms are at the same level and one of the rests is fastened on a tank, the corresponding diaphragm being in contact with the liquid contained in said tank and in such way that a pressure may be exerted on the other diaphragm by means of a flange tightly fastened thereon.

7. A pressure measurement device, according to claim 1, wherein are provided for a given measurement unit a set of bellows having different actual surfaces and a series of levers having different ratios, which may be respectively substituted one by another.

* * * * *